HAND TELEPHONE WITH TRANSMITTER CUTOUT

Filed June 21, 1967 2 Sheets-Sheet 1

INVENTOR
BELA BOTTOS

BY Thomas P. Sarro
ATTORNEY

HAND TELEPHONE WITH TRANSMITTER CUTOUT

Filed June 21, 1967 2 Sheets-Sheet 2

INVENTOR
BELA BOTTOS

BY Thomas P. Sarro
ATTORNEY 3,504,138
Patented Mar. 31, 1970

3,504,138

HAND TELEPHONE WITH TRANSMITTER CUTOUT

Bela Bottos, 2306 Greenfield Lane,
Knoxville, Tenn. 37917

Filed June 21, 1967, Ser. No. 647,682
Int. Cl. H04m 1/02
U.S. Cl. 179—167 4 Claims

ABSTRACT OF THE DISCLOSURE

Hand telephone having a disconnecting member attached to the transmitter and brought to a position which disconnects the transmitter but does not affect the receiver by an actuatable member which cooperates with the transmitter and is mounted in a manner that positions a portion thereof in an accessible location outside the transmitter receptacle.

This invention relates to hand telephones and more particularly to hand telephones provided with a transmitter switch.

There often occurs during telephone conversations, particularly lengthy telephone conversations, moments when it is desired or necessary, to audibly communicate with neighboring persons without interrupting or transmitting such communications to the calling party. With the conventional telephone this act is normally accomplished by the undependable and inconvenient covering of the transmitter with the free hand.

An object of the present invention is to provide a hand telephone having a transmitter switch by which the transmitter may be disconnected while permitting continued operation of the receiver.

Another object of the invention is a hand telephone having a transmitter switch by which the transmitter may be quickly rendered inoperable or operable by simple manipulation with a single finger of one hand, leaving the other hand free for other activity.

An important object of the invention is a unitary telephone-transmitter switch combination characterized by ease of operation and minimization of the likelihood of mechanical failure that make it particularly desirable to law enforcement officials, business and professional people and others frequently confronted with moments requiring confidental communication to parties other than the caller.

Other purposes and objects of the invention will appear as the description proceeds.

The telephone hand set of the invention is of the usual type, that is, having a hollow housing of insulating, e.g. plastic, material including an intermediate handle connecting a receiver receptacle and a transmitter receptacle holding respectively a receiver and a transmitter. The transmitter contains the usual circular, centrally-located contact member and annular contact member in electrical connection with two fixed transmitter contact elements, each of which in turn are connected to the necessary transmitter wiring. In accordance with the invention a disconnecting member is attached to and in intimate contact with the circular, centrally-located contact member and the annular member. The disconnecting member comprises a surface in intimate contact with the annular contact member of electrically non-conductive material and an outer surface of electrically conductive material. An actuatable member cooperates with the transmitter and is mounted in a manner that positions a portion thereof in an accessible location outside the transmitter receptacle. The actuatable member has two positions, a normal position in which the transmitter circuit is complete and an actuated position in which it revolves the transmitter placing the surface of electrically non-conductive material of the disconnecting member into contact with one of the fixed transmitter contact elements, thereby disconnecting the transmitter circuit.

For a better understanding of the invention, reference may be had to the following drawings in which.

Figures 1, 2, 3, 9:
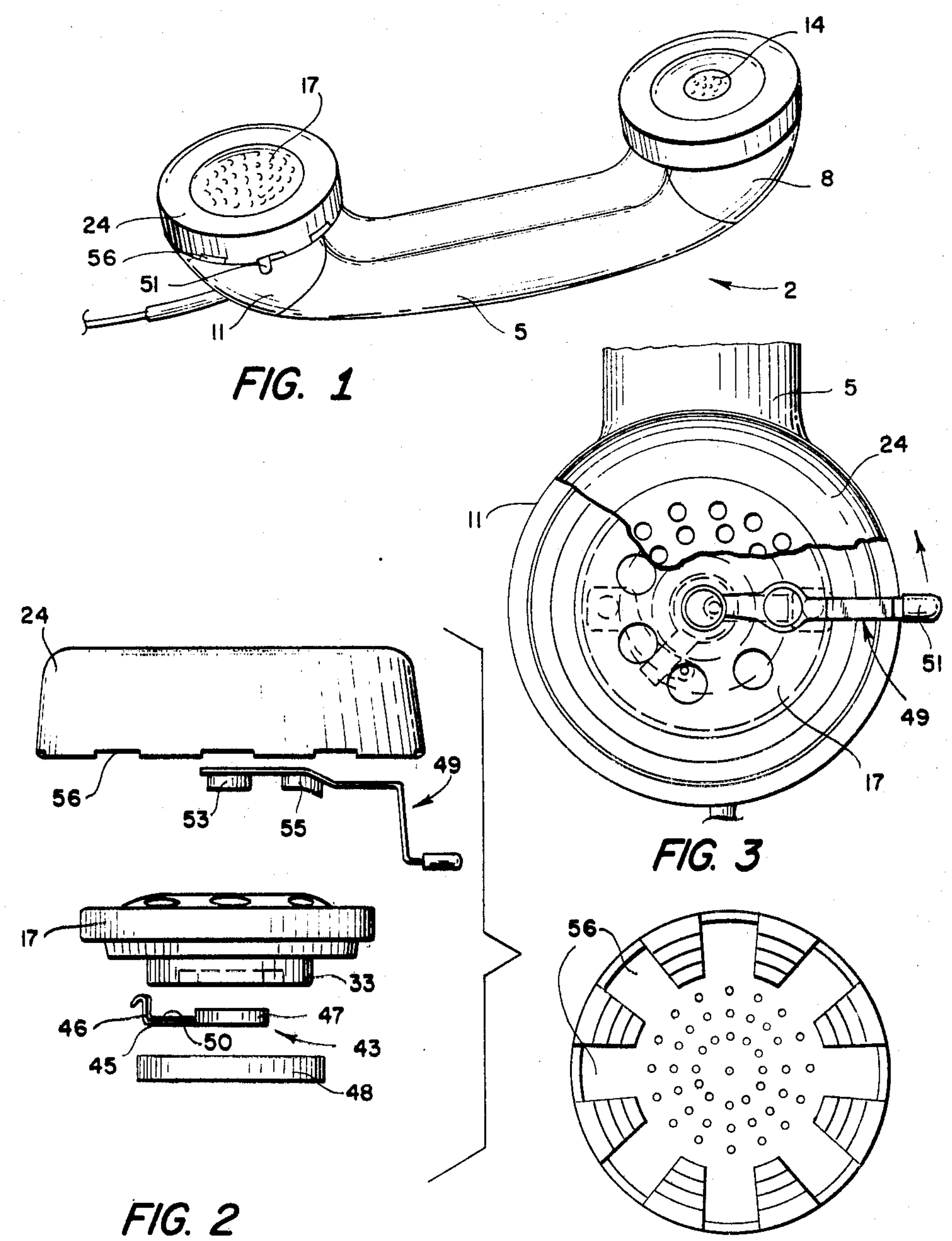
FIGURE 1 is a perspective view of the telephone hand-set of the present invention.
FIGURE 2 is an exploded view of the transmitter.
FIGURE 3 is a top elevation, partially in section of the transmitter in normal operation.
FIGURE 9 is a bottom elevation of the transmitter cap.
Figure 4:
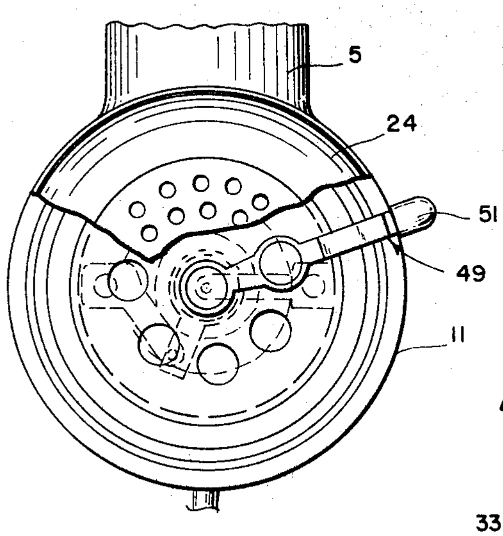
FIGURE 4 is a top elevation, partially in section of the transmitter when disconnected.
Figure 5:
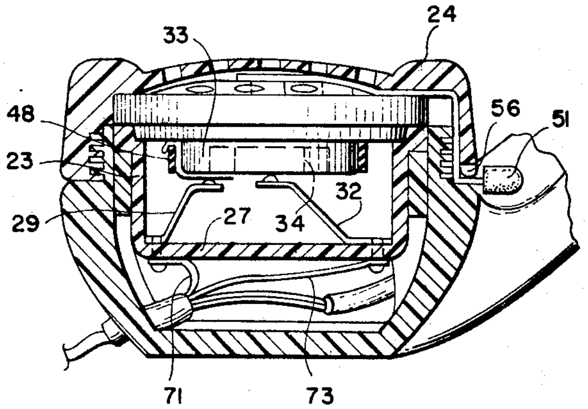
FIGURE 5 is a vertical section view of the transmitter.
Figure 6:
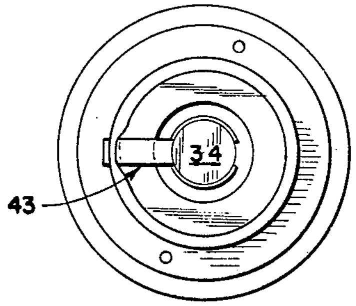
FIGURE 6 is a bottom elevation of the transmitter showing a preferred disconnecting member attached to the transmitter.
Figure 7:
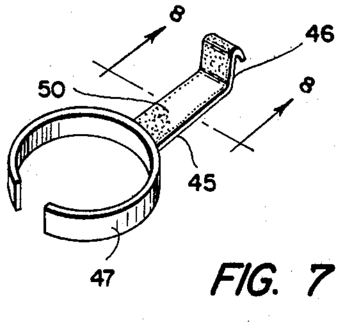
FIGURE 7 is a perspective view of the preferred disconnecting member.
Figure 8:
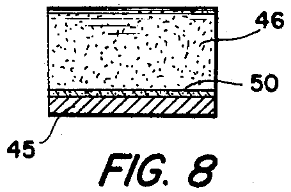
FIGURE 8 is a section view along lines 8—8 of FIGURE 7.

Referring to the drawings, the hand telephone comprises a hollow housing 2, including an intermediate handle 5, connecting a receiver receptacle 8 and a transmitter receptacle 11. A receiver 14 is disposed in receiver receptacle 8 and a transmitter 17 in transmitter receptacle 11. The transmitter receptacle 11 contains a transmitter cup 23 on which is seated the transmitter 17 and a transmitter cap 24. The base 27 of transmitter cup 23 is provided with fixed contact elements 29 and 32. Contact element 29 is normally in electrical connection with annular member 33 of transmitter 17 and contact element 32 is in contact with centrally-located circular member 34 of transmitter 17. The contact elements 29 and 32 are affixed respectively, to terminal 35 and terminal 38 and the necessary transmitter wires 71 and 73 from telephone cord 75 are connected to terminals 35 and 38, respectively.

Transmitter 17 is provided with a ring disconnecting member, indicated generally as 43, of electrically conductive material having a handle 45 attached to a ring portion 47. The handle 45 has a lip 46 at its end. The ring portion 47 fits around and contacts centrally-located circular member 34 of transmitter 17. The handle portion 45 with lip 46 of ring member 43 fits over and is in intimate contact with annular member 33 of transmitter 17. The topside of handle 45 and its lip 46 in intimate contact with annular member 33, contains a layer 50 of insulating or electrically non-conductive material such as lacquer, plastic, Scotch tape and like materials. The underside of the handle 45 and lip 46, and all of ring portion 47 are of electrically conductive material, preferably electrically conductive metal. Holding means 48 such as an elastic band is provided around annular member 33 and about lip 46 to secure ring member 43 preventing movement thereof about annular member 33.

The top of transmitter 17 is provided with an actuatable member indicated generally as 49 having a knob 51 at one end and two nipples 53 and 55 at the other end (see FIGURE 2). Nipple 53 at the far end of the actuatable member 49 fits into the central perforation of the plurality of perforations provided the speaking side of transmitters. The second nipple 55 of actuatable member 49 is spaced a distance from nipple 53 that permits placement thereof into one of the transmitter perforations near the periphery of the transmitter. The actuatable member is bent to fit between transmitter cap 24 and transmitter receptacle 11 and when positioned exits to the outside of transmitter receptacle 11 through a slot 56 provided the edge of transmitter cap 24. For convenience, transmitter cap 24 may be provided with a plurality of slots (see FIGURES 2 and 9) to permit positioning of the knob at points on the transmitter receptacle according to personal preferance and/or allow for variations in threadings among different transmitter receptacles. The slot is of a width sufficient to permit revolving movement of transmitter 17 from a position where handle 45 is out of contact with contact element 29 to a position contacting contact member 29.

In operation, when the transmitter is in condition for talking purposes, the ring handle 45 is out of contact with contact element 29, which in this position contacts annular member 33 and establishes a circuit which extends sequentially from contact element 29, transmitter 17 and contact element 32. When the actuatable member 49 is moved by sliding of knob 51, the transmitter revolves placing ring handle 45 in contact with contact member 29 thereby disconnecting the circuit conditioning the transmitter for talking purposes. The receiver 14 is in no way affected by the transmitter switch and remains in operation even when the transmitter is disconnected. Contact member 32 remains in continual electrical connection with centrally-located circular member 34 of transmitter 17 and a circuit is maintained through contact element 27, the bottom conductive portion of ring handle 45, ring portion 47, centrally located circular member 34, contact member 32. Return of the actuatable member 49 to its original position, returns the transmitter 17 to a position where the contact element 29 again contacts annular member 33 and completes the transmitter circuit for talking purposes.

Positioning of the transmitter 17 in transmitter cup 23 in proper relationship with the ring member 43 and switch lever 49 can be effected in any convenient manner. A preferred way is to seat the transmitter 17 in the cup 23, place the actuatable member on transmitter 17, screw on transmitter cap 24 and mark the point of exit of the knob 51. The transmitter cap is then removed and the angle between the point of exit and contact element 29 is measured. This angle is then used to position the ring member 43 so that the ring handle 45 rests at a point within the angle and just out of contact with contact member 29 at a distance such that when the actuatable member is actuated the ring handle 45 moves into contact with contact member 29. This position determined, the ring member is positioned and secured by holding means 48.

It is claimed:

1. In a hand telephone including a receiver receptacle and a transmitter receptacle, a receiver and a movable transmitter disposed respectively in said receiver receptacle and transmitter receptacle and an intermediate hollow handle interconnecting said receiver receptacle and transmitter receptacle, said transmitter having a circular, centrally-located contact member and an annular contact member in electrical connection with two fixed transmitter contact elements, the improvement which comprises a disconnecting member attached to and in intimate contact with said circular, centrally-located contact member and said annular contact member, said disconnecting members having a surface in intimate contact with said annular contact member of electrically non-conductive material and an outer surface of electrically conductive material, an actuatable member cooperating with said transmitter and mounted in a manner that positions a portion thereof in an accessible location outside said transmitter receptacle, said actuatable member having two positions, a normal position in which the transmitter circuit is complete and an actuated position in which it revolves the transmitter placing the surface of electrically non-conductive material of said disconnecting member into contact with one of said fixed transmitter contact elements.

2. The hand telephone of claim 1 wherein the disconnecting member is a ring member having a ring portion of electrically conductive material surrounding and in contact with the circular, centrally-located member of said transmitter and a handle portion in intimate contact with said annular member of said transmitter, said handle portion comprising a layer of electrically non-conductive material on the side in intimate contact with said annular member and a layer of electrically-conductive material.

3. The hand telephone of claim 2 wherein a holding means is provided for securing the ring member to said annular transmitter member.

4. The hand telephone of claim 3 wherein the holding means is an elastic band.

References Cited

UNITED STATES PATENTS

| | | | |
|---|---|---|---|
| 2,425,061 | 8/1947 | Hart | 179—188 |
| 2,838,615 | 6/1958 | Leifer | 179—158 |

FOREIGN PATENTS

| | | |
|---|---|---|
| 602,590 | 3/1960 | Italy. |

WILLIAM C. COOPER, Primary Examiner

U.S. Cl. X.R.

179—188